United States Patent
Lhost et al.

(10) Patent No.: US 12,128,640 B1
(45) Date of Patent: Oct. 29, 2024

(54) PROCESS FOR INCREASING HYDROPHOBICITY OF ARTICLES MADE OF POLYOLEFINS

(71) Applicants: TOTALENERGIES ONETECH, Courbevoie (FR); CENTRE NATIONAL DE LA RECHERCHE SCIENTIFIQUE (CNRS), Paris (FR)

(72) Inventors: Olivier Lhost, Seneffe (BE); Guillaume Espy, Villeurbanne (FR); Jannick Duchet-Rumeau, Villeurbanne (FR); Jean-François Gerard, Villeurbanne (FR); Sébastien Livi, Villeurbanne (FR)

(73) Assignees: TOTALENERGIES ONETECH, Courbevoie (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 18/708,286

(22) PCT Filed: Oct. 24, 2022

(86) PCT No.: PCT/EP2022/079625
§ 371 (c)(1),
(2) Date: May 8, 2024

(87) PCT Pub. No.: WO2023/083595
PCT Pub. Date: May 19, 2023

(30) Foreign Application Priority Data

Nov. 10, 2021 (EP) .................................... 21315240

(51) Int. Cl.
*B29C 71/00* (2006.01)
*B29K 623/00* (2006.01)

(52) U.S. Cl.
CPC .. *B29C 71/0009* (2013.01); *B29C 2071/0027* (2013.01); *B29K 2623/00* (2013.01); *B29K 2995/0093* (2013.01)

(58) Field of Classification Search
CPC ........ B29C 71/0009; B29C 2071/0018; B29C 2071/0027; B29C 2071/0036;
(Continued)

(56) References Cited

U.S. PATENT DOCUMENTS

| | | |
|---|---|---|
| 2015/0224539 A1 | 8/2015 | Lyons et al. |
| 2021/0197502 A1 | 7/2021 | Kramer et al. |

FOREIGN PATENT DOCUMENTS

WO 2021176217 A1 9/2021

OTHER PUBLICATIONS

International Search Report and Written Opinion issued in Application No. PCT/EP2022/079625, dated Feb. 1, 2023, 11 pages.
(Continued)

*Primary Examiner* — Stella K Yi
(74) *Attorney, Agent, or Firm* — Ewing & Jones, PLLC

(57) ABSTRACT

The disclosure provides a process for treatment of an article (1) made of a polymer composition; comprising the steps of providing an article (1) with a surface, the article being made of a polymer composition comprising one or more polyolefins; providing one or more texturing solvents (3, 5, 7, 9) selected from one or more vegetable oils, one or more terpenes, one or more alkanes and any combination thereof; wherein the one or more texturing solvents (3, 5, 7, 9) are further selected to have a boiling point which is above the crystallisation temperature Tc of the one or more polyolefins and to be devoid of a halogenated atom and/or an aromatic group; contacting the surface of the article (1) with the one or more texturing solvents (3, 5, 7, 9); and recovering an article with a textured surface with water contact angle
(Continued)

following ISO 19403-6:2017 that is increased by comparison to the initial water contact angle.

15 Claims, 2 Drawing Sheets

(58) Field of Classification Search
CPC ...... B29C 2071/0045; B29C 2071/025; B29C 66/7317; B29C 66/73175; B29C 66/73176
See application file for complete search history.

(56) References Cited

OTHER PUBLICATIONS

H. Yildirim Erbil et al., "Transformation of a simple plastic into a superhydrophobic surface"; Science, 2003, 299, 1377; 5 pages.

Z. Yuan et al., "Preparation and characterization of self-cleaning stable superhydrophobic linear low-density polyethylene"; Sci. Technolo. Adv. Mater., 2008, 9, 045007; 6 pages.

Rioboo, R. et al., "Superhydrophobic Surfaces from Various Polypropylenes"; Langmuir, 2008, 24, pp. 9508-9514.

Hejazi, I. et al., "Role of nanoparticles in phase separation and final morphology of superhydrophobic polypropylene/zinc oxide nanocomposite surfaces"; Appl. Surf. Sci., 2014, 293, pp. 116-123.

Cheng, Y. et al., "Facile preparation of high-density polyethylene superhydrophobic/ superoleophilic coatings on glass, copper and polyurethane sponge for self-cleaning, corrosion resistance and efficient oil/water separation"; J. Colloid Interface Sci., 2018, 525, pp. 76-85.

Yolcu, H. H et al., "The multiple effects of organoclay and solvent evaporation on hydrophobicity of composite surfaces"; Turkish J. Chem., 2017, 41, pp. 793-801.

Lu, X., Zhang, C. & Han, Y., "Low-Density Polyethylene Superhydrophobic Surface by Control of Its Crystallization Behavior"; Macromol. Rapid Commun., 2004, 25, pp. 1606-1610.

Contreras et al., "Permanent superhydrophobic polypropylene nanocomposite coatings by a simple one-step dipping process"; Appl. Surf. Sci., 2014, 307, pp. 234-240.

Barton, "Handbook of Polymer Liquid Interaction Parameters and Solubility Parameters", CRC Press, Inc., 1990, 41 pages.

Barton, "Handbook of Solubility Parameters and Other Cohesion Parameters", CRC Press, 1985, 77 pages.

G.J. Ray et al.; "Carbon-13 Nuclear Magnetic Resonance Determination of Monomer Composition and Sequence Distribution in Ethylene-Propylene Copolymers Prepared with a Stereoregular Catalyst System", Macromolecules, 1977, vol. 10, No. 4, pp. 773-778.

International Preliminary Report on Patentability issued in Application No. PCT/EP2022/079625, dated May 2, 2024, 7 pages.

PROCESS FOR INCREASING HYDROPHOBICITY OF ARTICLES MADE OF POLYOLEFINS

CROSS-REFERENCE TO RELATED APPLICATIONS

This application claims the benefit of PCT/EP2022/079625 filed Oct. 24, 2022, which claims priority from EP 21315240.8 filed Nov. 10, 2021, which are incorporated herein by reference in their entireties for all purposes.

TECHNICAL FIELD

The present disclosure relates to a process for increasing hydrophobicity of articles made of polyolefins.

TECHNICAL BACKGROUND

About 45 wt. % of the total weight of the plastic produced in the world in 2015 was used for packaging. The use of polymer composition for packaging is very useful to prevent food spoiling or contamination during transport and distribution, for example. However, the main drawback of plastics used for packaging is that they are single-use objects with an average lifetime of about half a year between their production and their wasting. To recycle plastic packaging articles, they need to be cleaned from the products they were protecting. While this goal can be achieved when the products are solids, the situation is more complex when the products are liquids that may adhere to the surface of the plastic packaging product. The soiling of the plastic packaging articles causes odour problems that is one of the recurring problems encountered when implementing plastics recycling.

Developing new materials that could repel the liquid product contained in plastic packaging articles like lotus leaves repel water, will make easier the recycling of plastic packaging articles by reducing their soiling. Moreover, with such materials, the content's loss due to the liquid product stuck in the packaging article will be decreased or even prevented. The "lotus effect" is called superhydrophobicity and is characterized by a very low adhesion of liquid water on a given surface.

A superhydrophobic surface results from the increase of the surface roughness so that the local geometry provides a large geometric area for a relatively small projected area. A surface is said superhydrophobic when, simultaneously, it has:

a water contact angle larger than 150°
 a hysteresis angle lower than 10°.

Superhydrophobicity of a surface can be achieved thanks to various additives (example: silica coated with polysiloxane, PTFE, etc.), initially mixed in the polymer or deposited on the finished article (by spray, etc.). By doing so, however, a component that is specific to superhydrophobicity is added. Regardless of a possible additive cost issue or the complexity of spray technology, this option is therefore not ideal from a recycling point of view since an additional compound is added. In addition, certain properties of the finished part, such as sealability, etc. can also sometimes be modified by the presence of this additive.

Micron-scale engraving techniques exist. They sometimes even make it possible to define very precisely the pattern represented on the polymer part. Considering the processing time of a part, they are not well suited to high-speed mass production.

US 2015/0224,539 describes a method for forming a surface, the method comprising steps of applying first nanoparticles to a surface of a polymer; and laminating the first nanoparticles to the surface under a predetermined set of conditions such that at least some of the first nanoparticles are partially embedded in the surface and partially exposed on it.

If a surface microstructure is desired for a packaging or a polymer-based fiber, it is industrially advantageous for the surface treatment technique to be adaptable to production lines for film, fibers, etc., for example to be fast, inexpensive or in a manner that it does not induce any additional toxic compound. The process of the disclosure falls into the latter category.

H. Yildirim Erbil et al. in "*Transformation of a simple plastic into a superhydrophobic surface*" (*Science,* 2003, 299, 1377) describe a method for forming superhydrophobic coating using polypropylene and a suitable selection of solvent and temperature to control the surface roughness. Crystallization/precipitation rate was controlled by either the temperature or by adding a non-solvent such as methylethylketone (MEK).

Z. Yuan et al. in "*Preparation and characterization of self-cleaning stable superhydrophobic linear low-density polyethylene*" (*Sci. Technolo. Adv. Mater.,* 2008, 9, 045007) describe the preparation of porous superhydrophobic linear low-density polyethylene (LLDPE) surface by adding some ethanol to an LLDPE solution.

Rioboo, R. et al. in "*Superhydrophobic Surfaces from Various Polypropylenes*" (*Langmuir,* 2008, 24, 9508-9514) describe experiments wherein surfaces were prepared by casting or dip-coating solutions of polypropylene (PP) of various molecular weight and tacticity. In all cases, by varying the quantity of coated material, superhydrophobic surfaces were obtained at ambient conditions even for atactic PP, showing that very low crystallinity can suffice to render the surface superhydrophobic. The solvent used was p-xylene.

Hejazi, I. et al. in "*Role of nanoparticles in phase separation and final morphology of superhydrophobic polypropylene/zinc oxide nanocomposite surfaces*" (*Appl. Surf. Sci.,* 2014, 293, 116-123) disclose that superhydrophobic polypropylene surfaces were prepared by incorporation of ZnO nanoparticles using the phase separation method via simple solution casting. It was found that the addition of ZnO conferred superhydrophobicity to PP coating via simultaneous formation of micro and nanospheres on the surface which resulted from the nucleating effect of ZnO for PP macromolecules leading to acceleration of the phase separation process.

Cheng, Y. et al. in "*Facile preparation of high-density polyethylene superhydrophobic/superoleophilic coatings on glass, copper and polyurethane sponge for self-cleaning, corrosion resistance and efficient oil/water separation*" (*J. Colloid Interface Sci.,* 2018, 525, 76-85) demonstrated that high-density polyethylene (HDPE) superhydrophobic/superoleophilic coatings can be easily prepared by dissolving bulk HDPE in xylene solution at 120° C., then adding a small amount of ethanol. Dropping the prepared HDPE ethanol-xylene solution onto various substrates (glass slide, copper mesh, kitchen sponge), followed by air drying at ambient temperature allowed the formation of superhydrophobic.

Yolcu, H. H et al. in "*The multiple effects of organoclay and solvent evaporation on hydrophobicity of composite surfaces*" (*Turkish J. Chem.,* 2017, 41, 793-801) describe that a superhydrophobic high-density polyethylene (HDPE)/ organoclay composite material with a water-static contact angle of ~162° and low hysteresis (7°) was prepared by a simple solution-intercalation technique. This one-step method consists in the insertion of organoclay, produced through cation exchange with cetyltrimethylammonium bromide (CTAB), in the polymer matrix at 120° C. in xylene. In this process, evaporation of the solvent and organoclay amount are the key factors for the achievement of superhydrophobicity.

Lu, X., Zhang, C. & Han, Y. in "*Low-Density Polyethylene Superhydrophobic Surface by Control of Its Crystallization Behavior*" (*Macromol. Rapid Commun.*, 2004, 25, 1606-1610) produced LDPE superhydrophobic surfaces with porous and floral structures of imperfect spherulites which were prepared by controlling the crystallization behavior of LDPE by increasing the crystallization time and nucleation rate after the polyethylene (PE) was dissolved in xylene.

Contreras et al. in "*Permanent superhydrophobic polypropylene nanocomposite coatings by a simple one-step dipping process*" (*Appl. Surf. Sci.*, 2014, 307, 234) report the production of superhydrophobic nanocomposite coatings on injection-molded polypropylene (PP) samples prepared by dipping in xylene solvent containing titanium dioxide nanoparticles (NPs) functionalized with trimethoxypropyl silane.

Most of these articles start from dilute solutions of PE or PP, especially in xylene, sometimes in toluene. A nonsolvent (ethanol for example) is often added to the solution. These solvents are not suitable because of their high toxicity. Indeed, there is still a risk that solvent residue is left on the final object. Superhydrophobic packaging produced from these methods may not be suitable for food contact. There is still a need for methods wherein the toxicity due to the presence of solvent residue is reduced or avoided.

WO2021/176217 relates to a method for post-processing a powder-based additively manufactured part. The method comprising the steps of providing a powder-based additively manufactured part, the additively manufactured part comprising a material having a melting point, providing a fluid for processing the additively manufactured part in order to improve the surface finish of the additively manufactured part, wherein the fluid comprises at least one solvent selected from an organic ester, an aromatic organic compound or an acetal, a heating step, wherein the fluid is heated; and an application step, wherein the heated fluid is applied to a surface of the additively manufactured part. It has been found this process can help to improve the surface finish of the additively manufactured part, e.g. resulting in a less rough (i.e. smoother) surface finish.

US2021/0197502 describes a method for treating a surface of a molded part produced in a 3D printing method. In the method, the molded part is introduced into a pressure-tight container, negative pressure, preferably a vacuum to a large extent, is generated in the container after introducing the molded part, a solvent is heated up to a specified solvent temperature, and the heated solvent is introduced from a solvent container into the container under negative pressure. In such a method, the temperature of the molded part is lower than the solvent temperature, and the solvent is evaporated or is introduced as a vapor upon being introduced, the solvent vapor condensing on the surface of the molded part. Also provided is a device for carrying out the method.

The present disclosure aims to provide a solution to one or more of the aforementioned drawbacks and problems. In particular, the present disclosure aims to provide a process to increase hydrophobicity on articles made from polyolefins such as polyethylene and polypropylene that is fast, and cheap, and therefore useful at an industrial scale; and that results in products of low or at least reduced toxicity. The present disclosure also aims to provide a process of treatment of articles made from polyolefins such as polyethylene and polypropylene that allows the treated articles to be more easily recycled and articles thereof.

SUMMARY OF THE DISCLOSURE

Surprisingly, it has been found that the above objectives can be attained either individually or in any combination, by the use of the one or more texturing solvents being green solvents selected from one or more vegetable oils, one or more terpenes, one or more alkanes and any combination thereof, wherein the one or more texturing solvents are further selected to be devoid of a halogenated atom and/or an aromatic group.

According to a first aspect, the present disclosure provides a process for treatment of an article made of a polymer composition; the process is remarkable in that it comprises the steps of:
  providing an article with a surface, the article being made of a polymer composition comprising one or more polyolefins;
  providing one or more texturing solvents selected from one or more vegetable oils, one or more terpenes, one or more alkanes and any combination thereof; wherein the one or more texturing solvents are further selected to have a boiling point which is above the crystallisation temperature Tc of the one or more polyolefins and to be devoid of a halogenated atom and/or an aromatic group;
  contacting the surface of the article with the one or more texturing solvents under texturing conditions;
  optionally rinsing the article;
  drying the article; and
  recovering an article with a textured surface;
and in that in the step of providing an article with a surface, the article has an initial water contact angle following ISO 19403-6:2017 and in the step of recovering an article with a textured surface the article has a textured surface with water contact angle following ISO 19403-6:2017 that is increased by comparison to the initial water contact angle.

It was found that it was possible to increase the hydrophobicity, in certain conditions up to reach superhydrophobicity, with the use of green solvents. As it is demonstrated by the examples, the present disclosure provides a process to increase hydrophobicity on articles made from polyolefins such as polyethylene and polypropylene that is fast and cheap and therefore useful at an industrial scale. In addition, the process of the disclosure involves reactants of reduced toxicity allowing the resulting product to be non-toxic or at least to show reduced toxicity by comparison to the products produced by known methods.

For example, the one or more texturing solvents have a boiling point of at least 120° C.; preferably, of at least 125° C. or at least 130° C.; more preferably, of at least 135° C., or at least 140° C.; even more preferably, of at least 145° C.; most preferably of at least 150° C. or at least 155° C.

In an embodiment, the one or more texturing solvents are selected to have a boiling point of at most Tm+75° C., with Tm being the melting temperature of the one or more polyolefins as determined according to ISO 11357-3:2018; preferably at most Tm+50° C., more preferably, at most Tm+30° C. and most preferably of at most Tm+15° C. When the one or more polyolefins comprise at least two polyolefins, the Tm to be considered is the Tm of the blend or in the case of non-miscible polyolefins, the Tm to be considered is the Tm of the most abundant component of the blend, present at the surface of the article.

For example, when the one or more polyolefins are or comprise polypropylene, the one or more texturing solvents may be selected to have a boiling point of at most 200° C.; preferably at most 190° C.; more preferably at most 180° C.

In another embodiment, the one or more texturing solvents may be selected to have a boiling point above Tm+75° C., with Tm being the melting temperature of the one or more polyolefins as determined according to ISO 11357-3:2018 and wherein the step of rinsing the article is performed.

Whatever is the embodiment selected, the step of rinsing the article may be performed with one or more rinsing solvents selected to have a boiling point of at most Tm−10° C. with Tm being the melting temperature of the one or more polyolefins as determined according to ISO 11357-3:2018; preferably, of at most Tm-20° C.; more preferably, of at most Tm-30° C.; even more preferably, of at most Tm-40° C. The person skilled in the art has the advantage of selecting a rinsing solvent having a low boiling point.

For example, when the one or more polyolefins are or comprise polypropylene, one or more rinsing solvents may be selected to have a boiling point of at most 130° C.; preferably, of at most 120° C.; more preferably, of at most 110° C.; even more preferably, of at most 100° C. For example, the step of rinsing the article is performed with one or more rinsing solvents selected from acid acetic, acetone, butanol, butanone, t-butyl alcohol, cyclohexane, methylcyclohexane, diethyl ether, 1,2-dimethoxy-ethane, 1,4-dioxane, ethanol, ethyl acetate, heptane, hexane, methanol, methyl t-butyl ether, pentane, propanol, tetrahydrofuran, water and any mixture thereof. With preference, the one or more rinsing solvents is or comprises methylcyclohexane.

Since the one or more texturing solvents are selected to be devoid of a halogenated atom and/or of an aromatic group, it is understood that the one or more texturing solvents used in the process of the present disclosure are devoid of halogenated solvents (such as chloroform and dichloromethane (DCM)) and/or are devoid of aromatic solvents (such as xylene and toluene).

In an embodiment, the one or more terpenes are selected from α-bisabolol, α-cedrene, α-phellandrene, α-pinene, α-terpineol, β-pinene, β-caryophyllene, borneol, cadinene, camphene, camphor, citral, citronellol, 3-carene, D-limonene, L-limonene, dipentene, eucalyptol, farnesene, fenchol, α-terpinene, geraniol, geranyl acetate, humulene, linalool, menthol, menthone, myrcene, nerol, nopol, ocimene, orange terpenes, phytol, terpinolene, valencene and any combination thereof. With preference, the one or more terpenes are selected from α-pinene, α-terpineol, citronellol, D-limonene, L-limonene, dipentene, eucalyptol, γ-terpinene, geraniol, linalool, menthol, menthone, nopol, terpinolene and any combination thereof. More preferably, α-terpineol, α-pinene, dipentene, eucalyptol, nopol, and any combination thereof. Even more preferably, the one or more terpenes are or comprise dipentene and/or α-pinene.

In case the one or more terpenes are selected from β-caryophyllene, cadinene, farnesene, ocimene, valencene and any combination thereof, the person skilled in the art may consider texturing conditions including a pressure above the atmospheric pressure in order to keep a reasonable time for the step of contacting the surface of the article with the one or more texturing solvents.

For example, the texturing conditions may comprise a pressure ranging from 0.1 to 1.0 MPa; preferably ranging from more than 0.1 to 0.8 MPa; even more preferably from 0.2 to 0.4 MPa.

In an embodiment, the one or more alkanes are selected from $C_9$-$C_{20}$ alkanes and any combination thereof. The one or more alkanes are selected from nonane, decane undecane, dodecane, tridecane, tetradecane, pentadecane, hexadecane, heptadecane, octadecane, nonadecane, icosane and any combination thereof. With preference, the one or more alkanes are or comprise decane and/or hexadecane.

In an embodiment, the one or more vegetable oils are selected from olive oil, peanut oil, coconut oil, canola oil, palm oil, sunflower oil and any combination thereof; with preference, the one or more vegetable oils are or comprise olive oil.

For example, the one or more vegetable oils comprise at least 70 wt. % of oleic acid based on the total weight of the one or more vegetable oils; preferably, at least 75 wt. %; more preferably at least 80 wt. %.

For example, the one or more polyolefins are selected from polyethylene, polypropylene or any mixture thereof.

For example, the texturing conditions comprise the one or more texturing solvents being at a temperature ranging from 70° C. to 180° C.; preferably from 80° C. to 150° C. or from 80° C. to 140° C.; more preferably from 90° C. to 135° C.

For example, the texturing conditions comprise a pressure ranging from 0.1 to 1.0 MPa; preferably ranging from more than 0.1 to 0.8 MPa; even more preferably from 0.2 to 0.4 MPa.

In a preferred embodiment, the texturing conditions comprise performing the contacting step at the atmospheric pressure.

For example, the texturing conditions comprise a contact time for a period ranging from 0.1 seconds to 5 minutes; preferably from 0.2 seconds to 1 minute; more preferably from 0.5 seconds to 40 seconds, even more preferably from 0.8 seconds to 20 seconds and most preferably from 1 second to 10 seconds.

In an embodiment, the step of contacting the surface of the article with the one or more texturing solvents is performed by immersion of the article in one or more baths of the one or more texturing solvents under texturing conditions; with preference, the process is a batch process or a continuous process. For example, the article is a film and the process is a continuous process.

In an embodiment, the immersion of the article in a bath of the one or more texturing solvents is a single immersion.

In another embodiment, the immersion of the article in a bath of the one or more texturing solvents comprises at least two successive immersions in at least two baths; with preference, a double-immersion is performed in two successive baths wherein the one or more texturing solvents of the first bath are at a temperature higher than the one or more texturing solvents of the second bath.

For example, the article is a packaging article. For example, the article is selected from a film, a molded article, an injected article and a blow-molded article. For example, the article is selected from a film, a bottle, a container, a tray and a ravier. With preference, the article is a film. For example, the article is a film and the process is a continuous process.

In an embodiment, in the step of providing an article with a surface, the article has an initial water contact angle following ISO 19403-6:2017 and in the step of recovering an article with a textured surface, the article has a textured surface with water contact angle following ISO 19403-6:

2017 that is increased by comparison to the initial water contact angle; and the textured surface has a water contact angle following ISO 19403-6:2017 of at least 130°.

For example, the drying step comprises drying the article at a drying temperature ranging from 20° C. to 80° C., or from 30° C. to 70° C. The drying time is selected by the person skilled in the art to be sufficient for drying the article and adapted from the reactant used (texturing solvent or rinsing solvent). For example, the drying time can be ranging from 1 to 24 hours.

For example, the drying step comprises drying the article at a drying temperature ranging from 20 to 80° C., or from 30° C. to 70° C., through a drying time ranging from 6 to 24 hours.

For example, the drying step comprises a sub-step of evacuating (i.e., creating a vacuum).

According to a second aspect, the disclosure provides an article made from the process according to the first aspect, wherein the article has a textured surface with a water contact angle larger than 150° and a contact angle hysteresis of less than 10° following ISO 19403-6:2017 with a 5 μL water droplet or with a 2 μL water droplet.

According to a third aspect, the disclosure provides for the use of one or more texturing solvents in a process for producing an article made of a polymer composition comprising one or more polyolefins with a textured surface remarkable in that the one or more texturing solvents comprise one or more solvents selected from one or more vegetable oils, one or more terpenes, one or more alkanes and any combination thereof; wherein the one or more texturing solvents are further selected to be devoid of a halogenated atom and of an aromatic group and wherein the one or more texturing solvents have a boiling point which is above the crystallisation temperature Tc of the one or more polyolefins.

According to a fourth aspect, the disclosure provides for the use of one or more texturing solvents in a process for treatment of an article made of a polymer composition as defined in the first aspect.

DETAILED DESCRIPTION

Figure 1:
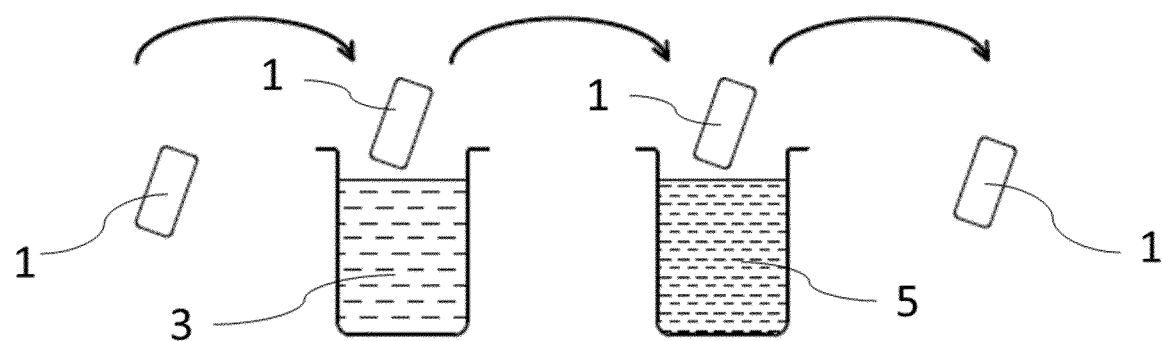
FIG. 1 illustrates the double-bath immersion texturing batch process.

When describing the polymers, uses and processes of the disclosure, the terms employed are to be construed by the following definitions, unless a context dictates otherwise. For the disclosure, the following definitions are given:

As used herein, a "polymer" is a polymeric compound prepared by polymerizing monomers, whether of the same or a different type. The generic term polymer thus embraces the term homopolymer, usually employed to refer to polymers prepared from only one type of monomer, and the terms copolymer and interpolymer as defined below.

As used herein, a "copolymer", "interpolymer" and like terms mean a polymer prepared by the polymerization of at least two different types of monomers. These generic terms include polymers prepared from two or more different types of monomer, e.g. terpolymers, tetrapolymers, etc.

As used herein, "blend", "polymer blend" and like terms refer to a composition of two or more compounds, for example, two or more polymers or one polymer with at least one other compound.

As used herein, the terms "polypropylene" (PP) and "propylene polymer" may be used synonymously. The term "polypropylene" encompasses polypropylene homopolymer resin, as well as copolymers of propylene which can be derived from propylene and a comonomer such as one or more selected from the group comprising $C_2$ or $C_4$-$C_{20}$ alpha-olefins, such as ethylene, 1-butene, 1-pentene, 1-hexene, 1-octene.

As used herein the terms "polyethylene" (PE) and "ethylene polymer" may be used synonymously. The term "polyethylene" encompasses homopolyethylene as well as copolymer of ethylene which can be derived from ethylene and a comonomer such as one or more selected from the group comprising $C_3$-$C_{20}$ alpha-olefins, such as 1-butene, 1-propylene, 1-pentene, 1-hexene, 1-octene.

The term "polypropylene resin" or "polyethylene resin" as used herein refers to polypropylene or polyethylene fluff or powder that is extruded, and/or melted and/or pelletized and can be produced through compounding and homogenizing of the polypropylene resin as taught herein, for instance, with mixing and/or extruder equipment. As used herein, the term "polypropylene" may be used as a shorthand for "polypropylene resin".

The term "fluff" or "powder" refers to polymer material with the hard catalyst particle at the core of each grain and is defined as the polymer material after it exits the polymerization reactor (or the final polymerization reactor in the case of multiple reactors connected in series).

Under normal production conditions in a production plant, it is expected that the melt index (MI2) will be different for the fluff than for the polyethylene resin and for the polypropylene resin. Under normal production conditions in a production plant, it is expected that the density will be slightly different for the fluff, than for the polyethylene resin and the polypropylene resin. Unless otherwise indicated, density and melt index for the polyethylene resin and the polypropylene resin refer to the density and melt index as measured on the polyethylene resin and for the polypropylene resin as defined above.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g., 1 to 5 can include 1, 2, 3, 4, 5 when referring to, for example, a number of elements, and can also include 1.5, 2, 2.75 and 3.80, when referring to, for example, measurements). The recitation of endpoints also includes the recited endpoint values themselves (e.g., from 1.0 to 5.0 includes both 1.0 and 5.0). Any numerical range recited herein is intended to include all sub-ranges subsumed therein.

The terms "virgin polymer" or "virgin resin" are used to denote a polymer or a resin directly obtained from a polymerization plant. The terms "virgin polypropylene" or "virgin polyethylene" are used to denote a polypropylene or a polyethylene directly obtained from a polymerization plant. The terms "directly obtained" is meant to include that the polypropylene or the polyethylene may optionally be passed through a pelletization step or an additivation step or both.

The terms "Post Consumer Resin", which may be abbreviated as "PCR", is used to denote a component of waste.

Throughout the present application the terms "polypropylene" and "propylene polymer" and "polypropylene resin" may be used synonymously. Similarly, the terms "polyethylene" and "ethylene polymer" and "polyethylene resin" may be used synonymously.

In the present disclosure, it is provided for a process for treatment of an article made of a polymer composition; the process is remarkable in that it comprises the steps of:
- providing an article with a surface, the article being made of a polymer composition comprising one or more polyolefins;
- providing one or more texturing solvents selected from one or more vegetable oils, one or more terpenes, one or more alkanes and any combination thereof; wherein the one or more texturing solvents are further selected to have a boiling point which is above the crystallisation temperature Tc of the one or more polyolefins and to be devoid of a halogenated atom and/or an aromatic group;
- contacting the surface of the article with the one or more texturing solvents under texturing conditions;
- optionally rinsing the article;
- drying the article; and
- recovering an article with a textured surface;

and in that in the step of providing an article with a surface, the article has an initial water contact angle following ISO 19403-6:2017 and in the step of recovering an article with a textured surface the article has a textured surface with water contact angle following ISO 19403-6:2017 that is increased by comparison to the initial water contact angle.

Selection of the Article Made of a Polymer Composition

It is preferred that the one or more polyolefins are selected from polyethylene, polypropylene or any mixture thereof.

Selection of One or More Polyolefins to be Polypropylene

In an embodiment, the polymer composition is or comprises polypropylene.

For example, the polypropylene is selected from isotactic polypropylene and syndiotactic polypropylene; for example, the polypropylene is isotactic.

For example, the polypropylene is selected from a propylene homopolymer, a copolymer of propylene with one or more comonomers selected from ethylene and $C_4$-$C_{20}$ alpha-olefins, a heterophasic polypropylene and any mixture thereof. In a preferred embodiment, the polypropylene is selected from a copolymer of propylene with one or more comonomers selected from ethylene and $C_4$-$C_{20}$ alpha-olefins, a heterophasic polypropylene and any mixture thereof.

In an example, the polypropylene is or comprises a homopolymer of propylene. A propylene homopolymer according to this disclosure has less than 0.2 wt. % based on the total weight of said propylene homopolymer, preferably less than 0.1 wt. %, more preferably less than 0.05 wt. % and, most preferably less than 0.005 wt. %, of alpha-olefins other than propylene in the polymer. Even most preferably, no other alpha-olefins are detectable. Accordingly, when a polypropylene is a homopolymer of propylene, the comonomer content in the polypropylene is less than 0.2 wt. %, more preferably less than 0.1 wt. %, even more preferably less than 0.05 wt. % and, most preferably less than 0.005 wt. % based on the total weight of the polypropylene.

In an example, the polypropylene is or comprises a copolymer of propylene and one or more comonomers. Suitable comonomers can be selected from the group comprising ethylene and aliphatic $C_4$-$C_{20}$ alpha-olefins. Examples of suitable aliphatic $C_4$-$C_{20}$ alpha-olefins include 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the comonomer is ethylene or 1-hexene. More preferably, the comonomer is ethylene.

In an example, the polypropylene is or comprises at least one propylene copolymer. The at least one propylene copolymer can be a random copolymer, a heterophasic copolymer or a mixture thereof.

The random propylene copolymer comprises at least 0.1 wt. % of one or more comonomers based of the total weight of said random propylene copolymer, preferably at least 1 wt. %. The at least one random propylene copolymer comprises up to 10 wt. % of one or more comonomers based of the total weight of said random propylene copolymer and most preferably up to 6 wt. %. Preferably, the at least one random copolymer is at least one copolymer of propylene and ethylene.

The at least one heterophasic propylene copolymer comprises a matrix propylene polymer phase and a dispersed phase of a rubber. With preference, the rubber is ethylene-propylene rubber (EPR).

The heterophasic propylene copolymers of the present disclosure as defined above can be produced by sequential polymerization in a series of polymerization reactors in presence of a catalyst system, wherein in a first polymerization stage the propylene polymer is produced, and in a second polymerization stage the rubber is produced by copolymerizing ethylene and at least one further olefin different from ethylene. The catalyst system is added to the first polymerization stage.

For example, the polypropylene has a melt index MI2 ranging from 0.1 to 260 g/10 min as determined according to ISO 1133 at 230° C. under a load of 2.16 kg; for example, from 0.5 to 200 g/10 min; for example, from 0.8 to 180 g/10 min; for example, from 1 to 160 g/10 min; for example, from 1.5 to 100 g/10 min; for example, from 2 to 80 g/10 min. The value of MI2 of the polypropylene is obtained without a degradation treatment.

In an embodiment, the polypropylene has a melt index MI2 ranging from 0.3 to 50 g/10 min as determined according to ISO 1133 at 230° C. under a load of 2.16 kg; for example, from 0.5 to 30 g/10 min; for example, from 0.6 to 25 g/10 min; for example, from 0.7 to 20 g/10 min; for example, from 0.8 to 18 g/10 min; for example, from 0.8 to 15 g/10 min. The value of MI2 of the polypropylene is obtained without a degradation treatment.

For example, the article is a film and the polypropylene has a melt index MI2 ranging from 0.8 to 15.0 g/10 min as determined according to ISO 1133 at 230° C. under a load of 2.16 kg; with preference, the film is a blown film or a cast film. The value of MI2 of the polypropylene is obtained without a degradation treatment.

For example, the article is a blown film and the polypropylene has a melt index MI2 ranging from 0.8 to 5.0 g/10 min as determined according to ISO 1133 at 230° C. under a load of 2.16 kg; with preference, from 1.0 to 4.0 g/10 min. The value of MI2 of the polypropylene is obtained without a degradation treatment.

For example, the article is a cast film and the polypropylene has a melt index MI2 ranging from 5.0 to 15.0 g/10 min as determined according to ISO 1133 at 230° C. under a load of 2.16 kg; with preference, from 8.0 to 12.0 g/10 min. The value of MI2 of the polypropylene is obtained without a degradation treatment.

The polypropylene can be produced by polymerizing propylene and one or more optional comonomers, in the presence of a catalyst being a metallocene catalyst or a Ziegler-Natta catalyst.

Examples of polypropylene suitable to be used in the polymer composition are commercially available from TotalEnergies. A non-limitative example is PPH4060 with a melt index MI2 of 3.0 g/10 min as determined according to ISO 1133 at 230° C. under a load of 2.16 kg.

For example, the polypropylene is selected from a virgin polypropylene resin, a polypropylene post-consumer resin and a blend of a virgin polypropylene resin and a polypropylene post-consumer resin.

Selection of One or More Polyolefins to be Polyethylene

In an embodiment, one or more polyolefins are or comprise a semi-crystalline polymer resin being polyethylene.

The polyethylene is preferably selected from an ethylene homopolymer, a copolymer of ethylene with one or more comonomers selected from $C_3$-$C_{20}$ alpha-olefins and any mixture thereof.

In an example, the polyethylene is a homopolymer of ethylene. An ethylene homopolymer according to this disclosure has less than 0.2 wt. % based on the total weight of said ethylene homopolymer, preferably less than 0.1 wt. %, more preferably less than 0.05 wt. % and, most preferably less than 0.005 wt. %, of alpha-olefins other than ethylene in the polymer. Even most preferably, no other alpha-olefins are detectable. Accordingly, when the polyethylene is a homopolymer of ethylene, the comonomer content in the polyethylene is less than 0.2 wt. %, more preferably, less than 0.1 wt. %, even more preferably, less than 0.05 wt. % and most preferably, less than 0.005 wt. % based on the total weight of the polyethylene.

The polyethylene may be a copolymer of ethylene and one or more comonomers, or a mixture thereof. Suitable comonomers can be selected from the group comprising aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the comonomer is propylene or 1-hexene. More preferably, the comonomer is propylene.

In an example, the polyethylene is an ethylene copolymer. The ethylene copolymer comprises at least 0.1 wt. % of one or more comonomers based on the total weight of said ethylene copolymer, preferably at least 1 wt. %. The ethylene copolymer comprises up to 10 wt. % of one or more comonomers based on the total weight of said ethylene copolymer and most preferably up to 6 wt. %. Preferably, the ethylene copolymer is a copolymer of propylene and ethylene.

The density of the polyethylene ranges from 0.820 g/cm$^3$ to 0.980 g/cm$^3$. Preferably, the polyethylene has a density of at most 0.960 g/cm$^3$, or of at most 0.940 g/cm$^3$ or of at most 0.939 g/cm$^3$ or of at most 0.936 g/cm$^3$. Preferably, the polyethylene has a density of at least 0.850 g/cm$^3$, more preferably of at least 0.900 g/cm$^3$, even more preferably of at least 0.910 g/cm$^3$ and most preferably of at least 0.915 g/cm$^3$. The density is determined according to ISO 1183 at a temperature of 23° C. The polyethylene comprises linear low-density polyethylene (LLDPE), low-density polyethylene (LDPE), medium-density polyethylene (MDPE), high-density polyethylene (HDPE), and mixtures thereof. For example, the polyethylene is or comprises high-density polyethylene (HDPE).

High-density polyethylene (HDPE) is defined to have a density of at least 0.940 g/cm$^3$. Medium-density polyethylene (MDPE) has a density ranging from 0.930-0.940 g/cm$^3$. Low-density polyethylene (LDPE) has a density ranging from 0.917-0.930 g/cm$^3$. Linear low-density polyethylene (LLDPE) has a density ranging from 0.910-0.930 g/cm$^3$.

In one or more embodiments, the polyethylene has a melt index MI2 ranging from 0.01 to 100 g/10 min or from 0.1 to 100 g/10 min as determined according to ISO 1133 at 190° C. under a load of 2.16 kg; for example, from 0.5 to 80 g/10 min; for example, from 1 to 50 g/10 min; for example, from 2 to 40 g/10 min, for example, from 3 to 30 g/10 min; for example, from 4 to 25 g/10 min; for example, from 5 to 20 g/10 min; for example, from 4 to 18 g/10 min; for example, from 0.1 to 20 g/10 min. The value of MI2 of the polyethylene is obtained without degradation.

In an embodiment, the polyethylene has a melt index MI2 ranging from 0.1 to 6.0 g/10 min as determined according to ISO 1133 at 190° C. under a load of 2.16 kg; for example, from 0.2 to 5.0 g/10 min. The value of MI2 of the polyethylene is obtained without a degradation.

For example, the article is a film and the polyethylene has a melt index MI2 ranging from 0.2 to 5.0 g/10 min as determined according to ISO 1133 at 190° C. under a load of 2.16 kg; with preference, the film is a blown film or a cast film. The value of MI2 of the polyethylene is obtained without degradation.

For example, the article is a blown film and the polyethylene has a melt index MI2 ranging from 0.2 to 2.0 g/10 min as determined according to ISO 1133 at 190° C. under a load of 2.16 kg; with preference, from 0.5 to 1.5 g/10 min. The value of MI2 of the polyethylene is obtained without degradation.

For example, the article is a cast film and the polyethylene has a melt index MI2 ranging from 2.0 to 5.0 g/10 min as determined according to ISO 1133 at 190° C. under a load of 2.16 kg; with preference, from 3.0 to 4.5 g/10 min. The value of MI2 of the polyethylene is obtained without degradation.

In one or more embodiments, the article is a blow-molded article; preferably, a bottle or a container; and the polyethylene has a melt index MI2 ranging from 0.05 to 2.0 g/10 min as determined according to ISO 1133 at 190° C. under a load of 2.16 kg; for example, from 0.1 to 1.0 g/10 min; for example, from 0.15 to 0.6 g/10 min. The value of MI2 of the polyethylene is obtained without degradation.

The at least one polyethylene resin can be produced by polymerizing ethylene and one or more optional comonomers, in the presence of a catalyst being a metallocene catalyst, or a chromium-based catalyst, or a Ziegler-Natta catalyst.

Examples of polyethylene resins suitable to be used as component A are commercially available from TotalEnergies. A non-limitative example is LLDPE M2310 with an MI2 of 0.9 g/10 min and a density of 0.923 g/cm$^3$. The MI2 is determined according to ISO 1133 at 190° C. under a load of 2.16 kg.

For example, the polyethylene is selected from a virgin polyethylene resin, a post-consumer polyethylene resin and a blend of a virgin polyethylene resin and a post-consumer polyethylene resin.

In an embodiment, the polymer composition is or comprises a semi-crystalline polymer resin being a mixture of at least one polypropylene and at least polyethylene wherein the at least one polypropylene and the at least polyethylene are as defined above.

The Article

For example, the article with a surface is selected from a film, a molded article, an injected article and a blow-molded article.

Selection of the One or More Texturing Solvents

The one or more texturing solvents are selected upon several criteria such as their solubility parameters and their boiling temperatures.

For example, the one or more texturing solvents have a boiling point that is ranging from Tc to Tm+75° C., with Tc being the crystallisation temperature and Tm being the melting temperature of the one or more polyolefins. Using such texturing solvents may allow avoiding the rinsing step.

For example, the one or more texturing solvents may be selected to have a boiling point above Tm+75° C., with Tm being the melting temperature of the one or more polyolefins as determined according to ISO 11357-3:2018 and in that the step of rinsing the article is performed.

When the polymer composition comprises more than one polyolefin, such as a blend of polyethylene and polypropylene, the Tc to be considered is the highest Tc of the blend and the Tm to be considered is the Tm of the most abundant polyolefin and in case of similar content, the highest Tm of the blend.

The process aims to dissolve the polymer composition at the surface of the article and to allow it to recrystallise so as to obtain an article with a textured surface. It was found that the use of a solvent with a boiling point that is too low; i.e., that is below the crystallisation temperature of the one or more polyolefins to dissolve, the dissolution in the solvent is difficult as it must be performed under pressure. Also, in case the boiling point is too high, it becomes difficult to remove the solvent after the texturing treatment.

For example, the one or more texturing solvents have a boiling point of at least 120° C.; preferably, of at least 125° C. or at least 130° C.; more preferably, of at least 135° C., or at least 140° C.; even more preferably, of at least 145° C.; most preferably of at least 150° C. or at least 155° C.

Advantageously, the one or more texturing solvents are selected to have a boiling point of at most Tm+75° C., with Tm being the melting temperature of the one or more polyolefins as determined according to ISO 11357-3:2018; preferably at most Tm+50° C., more preferably, at most Tm+30° C. and most preferably at most Tm+15° C. When the one or more polyolefins comprise at least two polyolefins, the Tm to be considered is the Tm of the blend or in case of non-miscible polyolefins, the Tm to be considered is the Tm of the most abundant component of the blend, present at the surface of the article.

For example, when the one or more polyolefins are or comprise polypropylene, the one or more texturing solvents may be selected to have a boiling point of at most 200° C.; preferably at most 190° C.; more preferably at most 180° C.

In another embodiment, the one or more texturing solvents may be selected to have a boiling point above Tm+75° C., with Tm being the melting temperature of the one or more polyolefins as determined according to ISO 11357-3:2018 and wherein the step of rinsing the article is performed; wherein the one or more texturing solvents have a boiling point of at most 400° C.; preferably, of at most 350° C.; more preferably, of at most 300° C., or at most 280° C., even more preferably, of at most 250° C. or at most 230° C.

For example, the texturing conditions may comprise a pressure ranging from 0.1 to 1.0 MPa; preferably ranging from more than 0.1 to 0.8 MPa; even more preferably from 0.2 to 0.4 MPa.

The solubility parameters must allow them to be qualified as a solvent for the one or more polyolefins of the polymer composition. The one or more solvents can be selected based on the Hansen solubility parameters. This system is described in Handbook of Polymer Liquid Interaction Parameters and Solubility Parameters, CRC Press, Inc., 1990, and Handbook of Solubility Parameters and Other Cohesion Parameters, A. C. F. M. M. See AFM Barton, CRC Press, 1985. As it is known to the person skilled in the art, the Hansen solubility parameters can be used to predict if one material will dissolve in another and form a solution.

Specifically, each molecule is given three Hansen parameters ($\delta H$, $\delta P$, $\delta D$), each generally measured in MPa$^{1/2}$.

$\delta D$ is the energy from dispersion forces between molecules;

$\delta P$ is the energy from dipolar intermolecular force between molecules;

$\delta H$ is the energy from hydrogen bonds between molecules.

These three parameters can be treated as co-ordinates for a point in three dimensions also known as the Hansen space. The nearer two molecules are in this three-dimensional space, the more likely they are to dissolve into each other. To determine if the parameters of two molecules (usually a solvent and a polymer) are within range, a value called interaction radius ($R_0$) is given to the substance being dissolved. In the present disclosure, the interaction radius $R_0$ used for both polypropylene and polyethylene as taken alone or in combination can be 6; preferably 4. For example, in the present disclosure, the interaction radius $R_0$ used for polyethylene can be 4 and the interaction radius $R_0$ used for polypropylene or a blend of polypropylene and polyethylene can be 6.

This value determines the radius of the sphere in Hansen space and its center is the three Hansen parameters. To calculate the distance ($R_a$) between Hansen parameters in Hansen space the following formula is used:

$$Ra = \sqrt{4(\delta D1 - \delta D2)^2 + (\delta P1 - \delta P2)^2 + (\delta H1 - \delta H2)^2} \quad (1)$$

wherein $\delta H1$, $\delta P1$ and $\delta D1$ and $\delta H2$, $\delta P2$ and $\delta D2$ are the Hansen parameters for the first and second material respectively.

Combining this with the interaction radius gives the relative energy difference (RED) of the system using the below equation $$RED = Ra/R_0 \quad (2)$$

when RED<1 the molecules are alike and will dissolve
when RED=1 the system will partially dissolve
when RED>1 the system will not dissolve According to the present disclosure, the one or more texturing solvents and the one or more polyolefins are selected to have relative energy difference (RED) equal to or below 1; preferably, equal to or below 0.8; more preferably, equal to or below 0.5. To facilitate the dissolution of the system, the person skilled in the art can consider selecting the one or more texturing solvents and the one or more polyolefins to have relative energy difference (RED) as close as possible to 0.

The below table 1 is reporting the solubility parameters and boiling point of different solvents for HDPE (including comparative solvents)

TABLE 1

| | Hansen solubility parameters (MPa$^{1/2}$) | | | | | |
|---|---|---|---|---|---|---|
| Substance | δD | δP | δH | Ra with PE | Ra with PP | Boiling point (° C.) |
| HDPE | 16.9 | 0.8 | 2.8 | 0.0 | 3.0 | — |
| PP | 18.0 | 0.0 | 1.0 | 3.0 | 0.0 | |
| Benzene | 17.2 | 1 | 2 | 1.0 | n.d. | 80 |
| Xylene | 17.8 | 1 | 3.1 | 1.8 | 2.4 | 140 |
| dipentene (D, L limonene) | 17.2 | 1.8 | 4.3 | 1.9 | 4.1 | 176 |
| α-pinene | 16.9 | 1.8 | 1.1 | 2.0 | 2.8 | 155 |
| n-butylbenzene | 17.4 | 0.1 | 1.1 | 2.1 | n.d. | 183 |
| Decahydronaphthalene | 17.6 | 0 | 0 | 3.2 | n.d. | 190 |
| Dodecane | 16 | 0 | 0 | 3.4 | n.d. | 215 |
| n-tetracosane (paraffin) | 15.9 | 0.1 | 0.1 | 3.4 | 4.3 | 391 |
| Decane | 15.7 | 0 | 0 | 3.8 | 4.7 | 174 |
| Oleic acid (80% olive oil) | 16 | 2.8 | 6.2 | 4.3 | 7.1 | 300 |

From the above it can be seen that xylene is a good solvent for both polyethylene and polypropylene, however, due to its high toxicity, it is not retained as a suitable solvent for the process of the disclosure. Indeed, the process of the present disclosure is aiming to use green solvents only. With this objective in mind, it is preferred that the one or more texturing solvents are devoid of halogenated solvents (such as chloroform and dichloromethane (DCM)) and/or are devoid of aromatic solvents (such as xylene and toluene).

According to the disclosure, the one or more texturing solvents are selected from one or more vegetable oils, one or more terpenes, one or more alkanes and any combination thereof.

In an embodiment, the one or more terpenes are selected from α-bisabolol, α-cedrene, α-phellandrene, α-pinene, α-terpineol, β-pinene, β-caryophyllene, borneol, cadinene, camphene, camphor, citral, citronellol, 3-carene, D-limonene, L-limonene, dipentene, eucalyptol, farnesene, fenchol, γ-terpinene, geraniol, geranyl acetate, humulene, linalool, menthol, menthone, myrcene, nerol, nopol, ocimene, orange terpenes, phytol, terpinolene, valencene and any combination thereof. With preference, the one or more terpenes are selected from α-pinene, α-terpineol, citronellol, D-limonene, L-limonene, dipentene, eucalyptol, γ-terpinene, geraniol, linalool, menthol, menthone, nopol, terpinolene and any combination thereof.

In an embodiment, the one or more terpenes are selected from α-bisabolol, α-cedrene, α-phellandrene, α-pinene, α-terpineol, β-pinene, borneol, camphene, camphor, citral, citronellol, 3-carene, D-limonene, L-limonene, dipentene, eucalyptol, fenchol, γ-terpinene, geraniol, geranyl acetate, humulene, linalool, menthol, menthone, myrcene, nerol, nopol, orange terpenes, phytol, terpinolene and any combination thereof. With preference, the one or more terpenes are selected from α-pinene, α-terpineol, citronellol, D-limonene, L-limonene, dipentene, eucalyptol, γ-terpinene, geraniol, linalool, menthol, menthone, nopol, terpinolene and any combination thereof. More preferably, α-terpineol, α-pinene, dipentene, eucalyptol, nopol, and any combination thereof. Even more preferably; the one or more terpenes are or comprise dipentene and/or α-pinene.

In an embodiment, the one or more alkanes are selected from $C_9$-$C_{20}$ alkanes and any combination thereof. The one or more alkanes are selected from nonane, decane undecane, dodecane, tridecane, tetradecane, pentadecane, hexadecane, heptadecane, octadecane, nonadecane, icosane and any combination thereof. With preference, the one or more alkanes are or comprise decane and/or hexadecane.

In an embodiment, the one or more vegetable oils are selected from olive oil, peanut oil, coconut oil, canola oil, palm oil, sunflower oil and any combination thereof; with preference, the one or more vegetable oils are or comprise olive oil.

For example, the one or more vegetable oils comprise at least 70 wt. % of oleic acid based on the total weight of the one or more vegetable oils; preferably, at least 75 wt. %; more preferably at least 80 wt. %.

In an embodiment, the one or more texturing solvents are selected to have Hansen Solubility Parameters wherein the relative energy difference ($R_a/R_0$) with the one or more polyolefins that is equal to or below 1 wherein $R_0$ is 6 for the polyolefin being polypropylene and/or polyethylene and preferably $R_0$ is 4.

The Step of Contacting the Surface of the Article with the One or More Texturing Solvents Under Texturing Conditions The step of contacting the surface of the article with the one or more texturing solvents can be performed in any way. In a preferred embodiment, this step is performed by immersion of the article in a bath of the one or more solvents under texturing conditions. With preference, the process is a batch process or a continuous process.

The immersion of the article in a bath of the one or more texturing solvents may be single or may comprise at least two successive immersions in at least two baths. When a double immersion is performed in two successive baths, the one or more texturing solvents of the first bath are at a temperature higher than the one or more texturing solvents of the second bath. In case of immersion in two or most baths, the different baths may have the same bath temperature or decreasing bath temperature. When the article is a film, the one or more immersion can be performed in a continuous process.

The temperature of the first bath is selected to be below the boiling point of the one or more texturing solvents and can be adapted to the Tm of the one or more polyolefins.

For example, the first bath may be at a first temperature ranging from 100° C. to 180° C.; preferably from 110° C. to 150° C.; more preferably from 120° C. to 140° C. For example, the second bath may be at a first temperature ranging from 70° C. to 110° C.; preferably from 75° C. to 100° C.; more preferably from 80° C. to 95° C.

The immersion time can be the same or different in the two to more baths; with preference, the first period can be shorter than the second period.

In a more general manner, the texturing conditions include the temperature of the one or more texturing solvents (i.e., the bath temperature) and the contact time (i.e., the immersion time).

In an embodiment, the texturing conditions comprise the one or more texturing solvents being at a temperature of at least 70° C., preferably of at least 80° C.; even more preferably, of at least 90° C., and most preferably of at least 100° C.

For example, the texturing conditions comprise the one or more texturing solvents being at a temperature of at most 150° C., preferably of at most 145° C.; even more preferably, of at most 140° C., and most preferably of at most 135° C.

For example, the texturing conditions comprise the one or more texturing solvents being at a temperature ranging from 70° C. to 150° C.; preferably from 80° C. to 140° C.; more preferably from 90° C. to 135° C.

For a given texturing solvent, an increase in the temperature will help to increase the water contact angle and/or to reduce the immersion time.

For example, the texturing conditions comprise a contact time for a period ranging from 0.1 seconds to 5 minutes; preferably from 0.2 seconds to 1 minute; more preferably from 0.5 seconds to 40 seconds, even more preferably from 0.8 seconds to 20 seconds and most preferably from 1 second to 10 seconds.

In an embodiment, the texturing conditions comprise a contact time for at least 0.1 seconds; preferably, of at least 0.2 seconds; more preferably, of at least 0.5 seconds; even more preferably, of at least 0.8 seconds; and most preferably, of at least 1 second.

In an embodiment, the texturing conditions comprise a contact time for at most 5 minutes; preferably, of at most 1 minute; more preferably, of at most 40 seconds; even more preferably, of at most 20 seconds; and most preferably, of at most 10 seconds.

The Optional Step of Rinsing the Article

A step of rinsing the article may be performed to assist the removing of the one or more texturing solvents. The rinsing step can be done in any way.

For example, one or more rinsing solvents may be selected to have a boiling point of at most Tm-10° C.; preferably, of at most Tm-20° C.; more preferably, of at most Tm-30° C.; even more preferably, of at most Tm-40° C. The person skilled in the art has the advantage of selecting a rinsing solvent having a low boiling point.

For example, when the one or more polyolefins are or comprise polypropylene, the step of rinsing the article is performed with one or more rinsing solvents selected to have a boiling point of at most 130° C.; preferably, of at most 120° C.; more preferably, of at most 110° C.; even more preferably, of at most 100° C.

For example, the one or more rinsing solvents are selected from acid acetic, acetone, butanol, butanone, t-butyl alcohol, cyclohexane, methylcyclohexane, diethyl ether, 1,2-dimethoxy-ethane, 1,4-dioxane, ethanol, ethyl acetate, heptane, hexane, methanol, methyl t-butyl ether, pentane, propanol, tetrahydrofuran, water and any combination thereof. With preference, the one or more rinsing solvents is or comprises methylcyclohexane.

The Optional Step of Drying the Article

The texturing conditions and the solvent selection may result in that the one or more solvents evaporate after the contacting step allowing the polymer composition to recrystallise forming a textured surface. The removal of the one or more solvents by evaporation can be helped by air blowing on the surface of the article.

Alternatively or in complement, the drying step comprises drying the article at a drying temperature ranging from 20° C. to 80° C. The drying time is selected by the person skilled in the art to be sufficient for drying the article and adapted from the reactant used (texturing solvent or rinsing solvent). For example, the drying time can be ranging from 1 to 24 hours.

The higher the drying temperature, the longer the drying time. The drying temperature may range from 25° C. to 70° C.; preferably from 30° C. to 60° C. The drying time may range from 8 to 20 hours, preferably from 10 to 18 hours, more preferably from 12 to 15 hours.

Practically, to remove all the solvent and to avoid re-solubilization, a evacuating sub-step, consisting of creating a vacuum, can be performed. The evacuating sub-step can last at least 30 min.

The Article with a Textured Surface

The process of the disclosure allows obtaining, in a simple manner, surfaces with increased hydrophobicity such as superhydrophobic surfaces.

For example, the article has an initial water contact angle following ISO 19403-6:2017 and in the step of recovering an article with a textured surface, the article has a textured surface with water contact angle following ISO 19403-6:2017 that is increased by comparison to the initial water contact angle; and the textured surface has a water contact angle following ISO 19403-6:2017 of at least 130°; more preferably at least 135°, even more preferably at least 140°; and most preferably at least 145° or at least 150°.

For example, the article has a textured surface with a water contact angle larger than 150° and a contact angle hysteresis of less than 10° following ISO 19403-6:2017 with a 5 µL water droplet.

The use of such articles allows recycling problems to be managed upstream since the articles will have reduced soiling so that they will be easier to recycle. The process of the disclosure is remarkable since its simplicity allows it to be used on an industrial scale.

Test Methods

The melt index MI2 of the polypropylene is determined according to ISO 1133 at 230° C. under a load of 2.16 kg.

The melt flow index MI2 of the polyethylene is determined according to ISO 1133 at 190° C. under a load of 2.16 kg.

The boiling point is defined by IUPAC since 1982 as the temperature at which boiling occurs under a pressure of one bar.

Molecular weights are determined by Size Exclusion Chromatography (SEC) at high temperatures (145° C.). A 10 mg polypropylene sample is dissolved at 160° C. in 10 mL of trichlorobenzene (technical grade) for 1 hour. Analytical conditions for the GPC-IR from Polymer Char are:

Injection volume: +/−0.4 mL;

Automatic sample preparation and injector temperature: 160° C.;

Column temperature: 145° C.;

Detector temperature: 160° C.;

Column set: 2 Shodex AT-806MS and 1 Styragel HT6E;

Flow rate: 1 mL/min;

Detector: IR5 Infrared detector (2800-3000 cm$^{-1}$);

Calibration: Narrow standards of polystyrene (commercially available);

Calculation for polypropylene: Based on Mark-Houwink relation ($\log_{10}(M_{PP})=\log_{10}(M_{PS})-0.25323$); cut off on the low molecular weight end at $M_{PP}=1000$;

Calculation for polyethylene: Based on Mark-Houwink relation ($\log_{10}(M_{PE})=0.965909 \log_{10}(M_{PS})-0.28264$); cut off on the low molecular weight end at $M_{PE}=1000$.

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well-known to the skilled person and include, for example, sufficient relaxation time etc. In practice, the intensity of a signal is obtained from its integral, i.e. the corresponding area. The data are acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenize the sample, followed by the addition of hexa-deuterobenzene ($C_6D_6$, spectroscopic grade) and a minor amount of hexamethyldisiloxane (HMDS, 99.5+%), with HMDS serving as an internal standard. To give an example, about 200 mg to 600 mg of polymer is dissolved in 2.0 mL of TCB, followed by the addition of 0.5 mL of CD and 2 to 3 drops of HMDS.

Following data acquisition, the chemical shifts are referenced to the signal of the internal standard HMDS, which is assigned a value of 2.03 ppm.

The comonomer content in polypropylene or polyethylene is determined by $^{13}$C-NMR analysis of pellets according to the method described by G. J. Ray et al. (Macromolecules, 1977, 10, (4), 773-778).

Crystallisation temperature (Tc) and Melting temperature (Tm) is determined according to ISO 11357-3:2018 on a DSC Q2000 instrument by TA Instruments. To erase the thermal history the samples are first heated to 220° C. and kept at 220° C. for 3 minutes. Then the polymer is cooled at −20° C./min. up to 20° C. and kept at 20° C. for 3 minutes. The crystallization temperature is determined during this cooling step. The crystallization temperature Tc corresponds to the temperature of the extremum of the spectrogram presenting the heat flux associated to the polymer as a function of the temperature during its cooling. The polymer is then melted up to 220° C. at 20° C./min. and the melting temperature is determined during this heating step. The melting temperature corresponds to the temperature of the extremum of the spectrogram presenting the heat flux associated with the polymer as a function of the temperature during its melting.

The density of polymer composition and the polyolefins is determined according to ISO 1183 at a temperature of 23° C.

EXAMPLES

The following non-limiting examples illustrate the disclosure.

Selection of the Materials

For polyethylene, the films used were made with HDPE BM593 (with a Tc of 115° C. and a Tm of 131.2° C.) or with LLDPE M2310 (with a Tc of 104.0° C. and a Tm of 115.2° C.) from TotalEnergies. For polyproylene, the films used were made with PPH4060 with a Tc of 120.8° C. and a Tm of 159.9° C.) from TotalEnergies.

Initial Wettability of the Films

For films made with HDPE BM593, the initial water contact angle was 100° and the initial contact angle hysteresis 19° following ISO 19403-6:2017 with a 5 µL water droplet.

For films made with LLDPE M2310, the initial water contact angle was 102° and the initial contact angle hysteresis 12° following ISO 19403-6:2017 with a 5 µL water droplet.

For films made with PPH4060, the initial water contact angle was 113° and the initial contact angle hysteresis 5° following ISO 19403-6:2017 with a 5 µL water droplet.

Example 1 Making HDPE Film or PP Film Superhydrophobic Using a Double-Immersion Process For the below-reported experiments 1 to 14, the following procedure was used except for experiment 13. A clean film was provided. Following the process described in FIG. 1, the film 1 was firstly immersed in a first solvent 3 at a first temperature for a first period of time. Film 1 was then immediately immersed in a second solvent 5 at a second temperature for a second period of time. The film 1 was then cooled and dried in air at room temperature for 5 minutes. Then, the film was placed in a vacuum oven at 60° C. overnight to fully eliminate the solvent.

In all experiments 1 to 12 and 14, the first and second solvent were the same. In all experiments 1 to 12 and 14, the first bath temperature was higher than the second bath temperature. In all experiments 1 to 12 and 14, the first period of time was shorter than the second period of time.

For experiment 13, a clean film of PP PPH4060 from TotalEnergies was provided. Following the process described in 1, the film was firstly immersed in olive oil at 170° C. for 5 minutes.

The film was then immediately immersed in olive oil at 100° C. for 5 minutes. The film was then cooled at room temperature for 5 minutes and rinsed with methylcyclohexane to remove olive oil. Then, the film was placed in a vacuum oven at 60° C. overnight to fully eliminate the solvent.

TABLE 2

Texturing conditions and wettability for double-immersion process.
Confidence intervals for wettability are given for a 95% certitude.

| Material | Solvent | Texturing conditions | Wettability (ISO 19403-6: 2017) θ (°) | Δθ (°) | Film # |
|---|---|---|---|---|---|
| HDPE (BM593) | Dipentene | 130° C. 10 s + 80° C. 5 min | 178 ± 5 | 5 ± 1 | 1 |
| | | 130° C. 10 s + 100° C. 5 min | 178 ± 5 | 5 ± 1 | 2 |
| | α-pinene | 130° C. 30 s + 80° C. 5 min | 178 ± 5 | 5 ± 1 | 3 |
| | | 130° C. 30 s + 100° C. 5 min | 151 ± 2 | 5 ± 1 | 4 |
| | Decane | 140° C. 30 s + 80° C. 5 min | 178 ± 5 | 5 ± 1 | 5 |
| | | 140° C. 30 s + 100° C. 5 min | 178 ± 5 | 5 ± 1 | 6 |
| PP (PPH4060) | Dipentene | 130° C. 10 s + 80° C. 5 min | 178 ± 5 | 5 ± 1 | 7 |
| | | 130° C. 10 s + 100° C. 5 min | 178 ± 5 | 5 ± 1 | 8 |
| | α-pinene | 130° C. 5 s + 80° C. 5 min | 163 ± 12 | 5 ± 1 | 9 |
| | | 130° C. 5 s + 100° C. 5 min | 161 ± 11 | 6 ± 5 | 10 |
| | Decane | 130° C. 5 s + 80° C. 5 min | 178 ± 5 | 5 ± 4 | 11 |
| | | 130° C. 5 s + 100° C. 5 min | 178 ± 5 | 5 ± 1 | 12 |
| | Olive oil | 170° C. 5 min + 100° C. 5 min | 178 ± 5 | 5 ± 1 | 13 |
| LLDPE (M2310) | Dipentene | 100° C. 3 s + 80° C. 1 min | 150 ± 9 | 5 ± 6 | 14 |

As it can be seen from the results, superhydrophobic surface was obtained for all films.

In experiment 1, the resulting film surface is textured with randomly packed flakes of about 3 µm average width and 100 nm average thick, as observed by SEM. The surface is superhydrophobic with an advancing water contact angle of 178° and a contact angle hysteresis of 5°, following ISO 19403-6:2017 with a 5 µL water droplet.

In experiment 2, the resulting film surface is textured with randomly packed imbricated flakes of about 3 µm average width and 100 nm average thick, as observed by SEM. The surface is superhydrophobic with an advancing water contact angle of 178° and a contact angle hysteresis of 5°, following ISO 19403-6:2017 with a 5 µL water droplet.

In experiment 3, the resulting film surface is textured with randomly packed imbricated flakes of about 3 µm average width and 100 nm average thick, as observed by SEM. The surface is superhydrophobic with an advancing water contact angle of 178° and a contact angle hysteresis of 5°, following ISO 19403-6:2017 with a 5 µL water droplet.

In experiment 4, the resulting film surface is textured with randomly packed flakes of about 3 µm average width and 100 nm average thick, as observed by SEM. The surface is superhydrophobic with an advancing water contact angle of 151° and a contact angle hysteresis of 5°, following ISO 19403-6:2017 with a 5 µL water droplet.

In experiment 5, the resulting film surface is textured with randomly packed flakes of about 3 µm average width and 100 nm average thick, as observed by SEM. The surface is superhydrophobic with an advancing water contact angle of 178° and a contact angle hysteresis of 5°, following ISO 19403-6:2017 with a 5 µL water droplet.

In experiment 6, the resulting film surface is textured with randomly packed imbricated flakes of about 3 µm average width and 100 nm average thick, as observed by SEM. The surface is superhydrophobic with an advancing water contact angle of 178° and a contact angle hysteresis of 5°, following ISO 19403-6:2017 with a 5 µL water droplet.

In experiment 7, the resulting film surface is textured with spherical asperities of about 3 µm average with a bead-like organization, as observed by SEM. The surface is superhydrophobic with an advancing water contact angle of 178° and a contact angle hysteresis of 5°, following ISO 19403-6:2017 with a 5 µL water droplet.

In experiment 8, the resulting film surface is textured with spherical asperities of about 1 µm average with a bead-like organization, as observed by SEM. The surface is superhydrophobic with an advancing water contact angle of 178° and a contact angle hysteresis of 5°, following ISO 19403-6:2017 with a 5 µL water droplet.

In experiment 9, the resulting film surface is textured with spherical asperities of about 1 µm average with a bead-like organization, as observed by SEM. The surface is superhydrophobic with an advancing water contact angle of 163° and a contact angle hysteresis of 6°, following ISO 19403-6:2017 with a 5 µL water droplet.

In experiment 10, the resulting film surface is textured with spherical asperities of about 2 µm average with a bead-like organization, as observed by SEM. The surface is superhydrophobic with an advancing water contact angle of 161° and a contact angle hysteresis of 5°, following ISO 19403-6:2017 with a 5 µL water droplet.

In experiment 11, the resulting film surface is textured with spherical asperities of about 1 µm average with a bead-like organization, as observed by SEM. The surface is superhydrophobic with an advancing water contact angle of 178° and a contact angle hysteresis of 5°, following ISO 19403-6:2017 with a 5 µL water droplet.

In experiment 12, the resulting film surface is textured with densely packed asperities of about 150 nm average width, as observed by SEM. The surface is superhydrophobic with an advancing water contact angle of 178° and a contact angle hysteresis of 5°, following ISO 19403-6:2017 with a 5 µL water droplet.

In experiment 13, the resulting film surface is textured with randomly packed squared flakes of about 2 µm average width and 100 nm average thick, as observed by SEM. The surface is superhydrophobic with an advancing water contact angle of 178° and a contact angle hysteresis of 5°, following ISO 19403-6:2017 with a 5 µL water droplet.

In experiment 14, the resulting film surface is textured with randomly packed flakes of about 4 µm average width and 2 µm average thick, as observed by SEM. The surface is superhydrophobic with an advancing water contact angle of 150°, and a contact angle hysteresis of 5°, following ISO 19403-6:2017 with a 5 µL water droplet.

Figure 2:
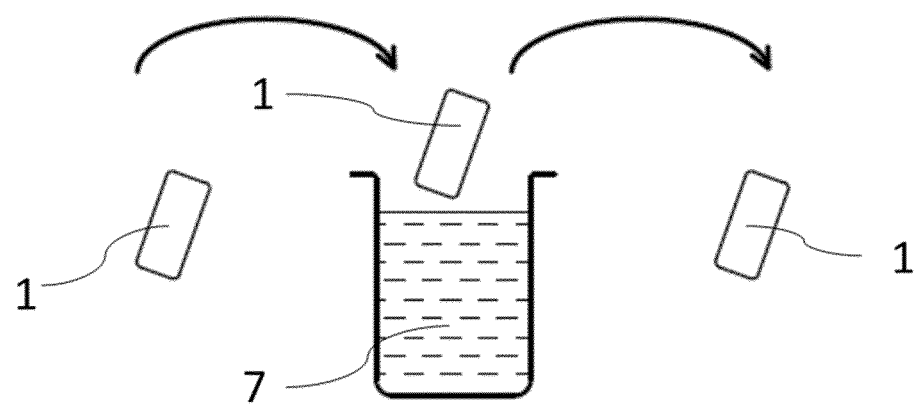
FIG. 2 illustrates the single-bath immersion texturing batch process.

Example 2 Making HDPE Film or PP Film Superhydrophobic Using a Single-Immersion Process For the below-reported experiments 15 to 17, 19 to 22 and 24 to 27, the following procedure was used. A clean film was provided. Following the process described in FIG. 2 the film 1 was immersed in a solvent 7 at a given temperature for a given period of time. Film 1 was then cooled at room temperature for 5 minutes. Then, the film was placed in a vacuum oven at 60° C. overnight to fully eliminate the solvent.

For experiments 18 and 23, the following procedure was used. A clean film was provided. Following the process described in FIG. 2, the film was immersed in hexadecane at 130° C. for 5 seconds. The film was then cooled at room temperature for 5 minutes and rinsed with methylcyclohexane to remove hexadecane. Then, the film was placed in a vacuum oven at 60° C. overnight to fully eliminate the solvent.

For polyethylene, the films used were made with HDPE BM593 or with LLDPE M2310 from TotalEnergies. For polyproylene, the films used were made with PPH4060 from TotalEnergies.

TABLE 3

Texturing conditions and wettability for double-immersion process.
Confidence intervals for wettability are given for a 95% certitude.

| Material | Solvent | Texturing conditions | Wettability (ISO 19403-6: 2017) $\theta$ (°) | $\Delta\theta$ (°) | Film # |
|---|---|---|---|---|---|
| HDPE (BM593) | Dipentene | 130° C. 10 s | 147 ± 3 | 10 ± 2 | 15 |
|  | α-pinene | 130° C. 1 s | 145 ± 2 | 8 ± 9 | 16 |
|  | Decane | 140° C. 30 s | 144 ± 6 | 16 ± 1 | 17 |
|  | Hexadecane | 130° C. 5 s | 147 ± 7 | 14 ± 5 | 18 |
| PP (PPH4060) | Dipentene | 130° C. 5 s | 154 ± 2 | 11 ± 2 | 19 |
|  |  | 110° C. 30 s | 147 ± 4 | 9 ± 1 | 20 |
|  | α-pinene | 110° C. 30 s | 151 ± 2 | 11 ± 2 | 21 |
|  | Decane | 130° C. 10 s | 149 ± 5 | 8 ± 5 | 22 |
|  | Hexadecane | 130° C. 5 s | 164 ± 1 | 5 ± 3 | 23 |
| LLDPE (M2310) | Dipentene | 100° C. 5 s | 143 ± 3 | 20 ± 1 | 24 |
|  | α-pinene | 100° C. 5 s | 147 ± 3 | 17 ± 5 | 25 |
|  | Decane | 100° C. 5 s | 145 ± 4 | 15 ± 1 | 26 |
|  | Hexadecane | 100° C. 5 s | 154 ± 5 | 15 ± 4 | 27 |

In experiment 15, the resulting film surface is textured with closely packed flakes of about 3 μm average width and 200 nm average thick, as observed by SEM. The surface is highly hydrophobic with an advancing water contact angle of 147°, and a contact angle hysteresis of 10°, following ISO 19403-6:2017 with a 2 μL water droplet.

In experiment 16, the resulting film surface is textured with randomly packed flakes of about 3 μm average width and 100 nm average thick, as observed by SEM. The surface is highly hydrophobic with an advancing water contact angle of 145°, and a contact angle hysteresis of 8°, following ISO 19403-6:2017 with a 2 μL water droplet.

In experiment 17, the resulting film surface is textured with folded asperities of about 4 μm average and no apparent organization, as observed by SEM. The surface is highly hydrophobic with an advancing water contact angle of 144°, and a contact angle hysteresis of 16°, following ISO 19403-6:2017 with a 2 μL water droplet.

In experiment 18, the resulting film surface is textured with closely packed flakes of about 5 μm average width and 300 nm average thick, as observed by SEM. The surface is highly hydrophobic with an advancing water contact angle of 147°, and a contact angle hysteresis of 14°, following ISO 19403-6:2017 with a 2 μL water droplet.

In experiment 19, the resulting film surface is textured with spherical asperities of about 2 μm average and with a bead-like organization, as observed by SEM. The surface is highly hydrophobic with an advancing water contact angle of 154°, and a contact angle hysteresis of 11°, following ISO 19403-6:2017 with a 2 μL water droplet.

In experiment 20, the resulting film surface is textured with closely packed spherical asperities of about 1 μm average, as observed by SEM. The surface is highly hydrophobic with an advancing water contact angle of 147°, and a contact angle hysteresis of 9°, following ISO 19403-6:2017 with a 2 μL water droplet.

In experiment 21, the resulting film surface is textured with closely packed spherical asperities of about 1 μm average, as observed by SEM. The surface is highly hydrophobic with an advancing water contact angle of 151°, and a contact angle hysteresis of 11°, following ISO 19403-6:2017 with a 2 μL water droplet.

In experiment 22, the resulting film surface is textured with randomly packed squared asperities of about 1 μm average, as observed by SEM. The surface is highly hydrophobic with an advancing water contact angle of 149°, and a contact angle hysteresis of 8°, following ISO 19403-6:2017 with a 2 μL water droplet.

In experiment 23, the resulting film surface is textured with spherical asperities of about 2 μm average with a bead-like organization, as observed by SEM. The surface is superhydrophobic with an advancing water contact angle larger than 150° (measured at 164°), and a contact angle hysteresis of less than 10° (measured at 5°), following ISO 19403-6:2017 with a 2 μL water droplet.

In experiment 24, the resulting film surface is textured with densely packed flakes of about 4 μm average width and 500 nm average thick, as observed by SEM. The surface is highly hydrophobic with an advancing water contact angle of 143°, and a contact angle hysteresis of 20°, following ISO 19403-6:2017 with a 2 μL water droplet.

In experiment 25, the resulting film surface is textured with flower-like asperities of about 6 μm with "leaves" of about 2 μm average width and 300 nm average thick, as observed by SEM. The surface is highly hydrophobic with an advancing water contact angle of 147°, and a contact angle hysteresis of 17°, following ISO 19403-6:2017 with a 2 µL water droplet.

In experiment 26, the resulting film surface is textured with densely packed folded asperities of about 5 µm average, as observed by SEM. The surface is highly hydrophobic with an advancing water contact angle of 145°, and a contact angle hysteresis of 15°, following ISO 19403-6:2017 with a 2 µL water droplet.

In experiment 27, the resulting film surface is textured with densely packed folded flakes of about 5 µm average width and 200 nm average thick, as observed by SEM. The surface is highly hydrophobic with an advancing water contact angle of 154°, and a contact angle hysteresis of 15°, following ISO 19403-6:2017 with a 2 µL water droplet.

Figure 3:
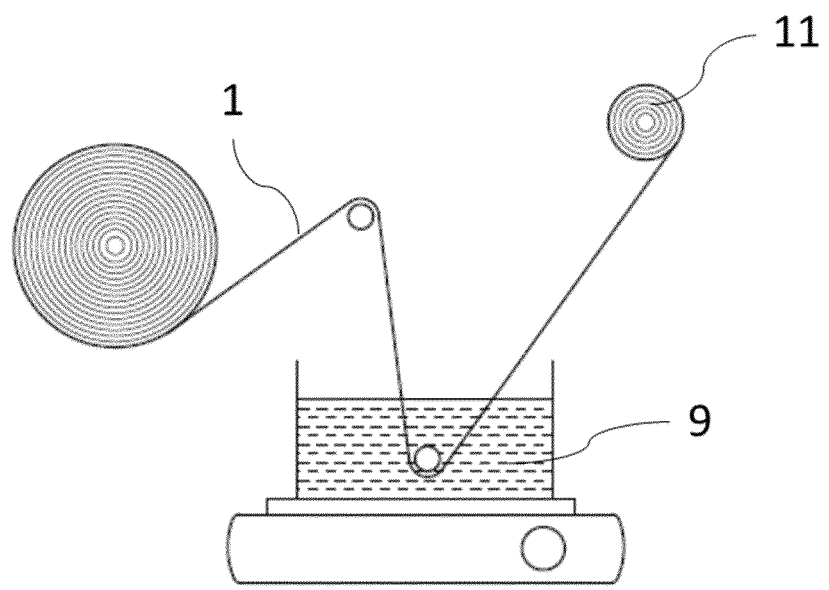
FIG. 3 illustrates the in-line texturing process with a single bath immersion for films. The film goes through a unique hot solvent bath and is cooled in the air at room temperature just out of the bath.

Example 3—Making HDPE Film or PP Film Superhydrophobic Using a Single-Immersion Process in a Continuous Line For the below-reported experiments 28 to 31, the following procedure was used. A clean film was provided. Following the process described in FIG. 3, the film 1 was unrolled at 75 meters per hour and plunged in a dipentene bath 9 at a given temperature for about 2 seconds. The film 1 was then cooled at room temperature from the bath to the roller 11 in about 24 seconds. Then, the film was placed in a vacuum oven at 60° C. overnight to fully eliminate the solvent.

TABLE 4

Texturing conditions and wettability for in line-immersion process.
Confidence intervals for wettability are given for a 95% certitude.

| Material | Solvent | Texturing conditions | Wettability (ISO 19403-6: 2017) θ (°) | Δθ (°) | Film # |
|---|---|---|---|---|---|
| HDPE (BM593) | Dipentene | 130° C. 2 s | 151 ± 1 | 5 ± 1 | 28 |
|  |  | 140° C. 2 s | 166 ± 2 | 5 ± 1 | 29 |
| PP (PPH4060) | Dipentene | 130° C. 2 s | 151 ± 1 | 5 ± 1 | 30 |
|  |  | 140° C. 2 s | 171 ± 9 | 5 ± 1 | 31 |

In experiment 28, the resulting film surface is textured with randomly packed flakes of about 3 µm average width and 100 nm average thick, as observed by SEM. The surface is superhydrophobic with an advancing water contact angle larger than 150° (measured at 151°), and a contact angle hysteresis of less than 10° (measured at 5°), following ISO 19403-6:2017 with a 2 µL water droplet.

Figure 4:
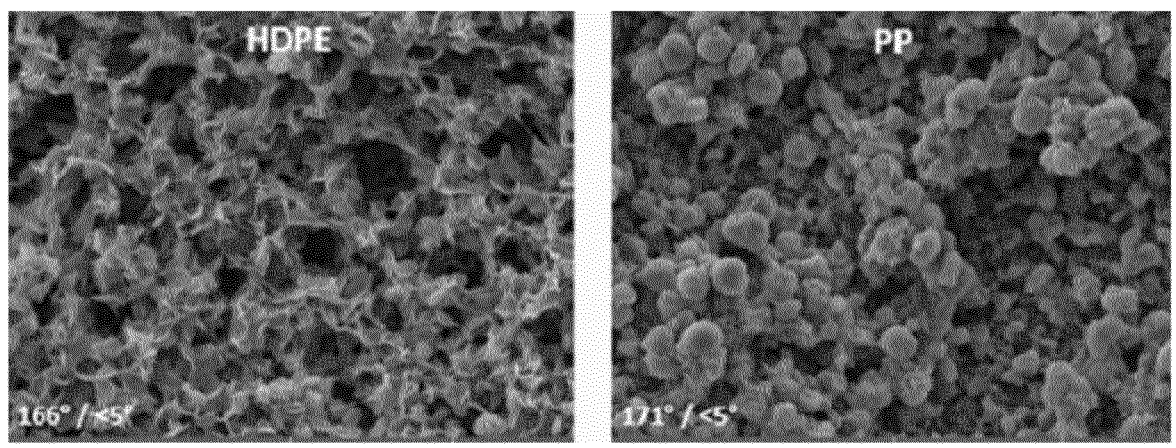
FIG. 4 are SEM images of textured HDPE film and PP film obtained according to the process of the present disclosure.

In experiment 29, the resulting film surface is textured with randomly packed imbricated flakes of about 3 µm average width and 100 nm average thick, as observed by SEM and shown in FIG. 4 (left part). The surface is superhydrophobic with an advancing water contact angle larger than 150° (measured at 166°), and a contact angle hysteresis of less than 10° (measured at 5°), following ISO 19403-6:2017 with a 2 µL water droplet.

In experiment 30, the resulting film surface is textured with spherical asperities of about 2 µm average with a bead-like organization, as observed by SEM. The surface is superhydrophobic with an advancing water contact angle larger than 150° (measured at 152°), and a contact angle hysteresis of less than 10° (measured at 5°), following ISO 19403-6:2017 with a 2 µL water droplet.

In experiment 31, the resulting film surface is textured with randomly packed spherical asperities of about 4 µm average, as observed by SEM and shown in FIG. 4 (right part). The surface is superhydrophobic with an advancing water contact angle larger than 150° (measured at 171°), and a contact angle hysteresis of less than 10° (measured at 5°), following ISO 19403-6:2017 with a 2 µL water droplet.

The invention claimed is:

1. Process for treatment of an article made of a polymer composition; the process is characterized in that it comprises the steps of:
   providing an article with a surface, the article being made of a polymer composition comprising one or more polyolefins;
   providing one or more texturing solvents selected from one or more vegetable oils, one or more terpenes, one or more alkanes and any combination thereof; wherein the one or more texturing solvents are further selected to have a boiling point which is above the crystallisation temperature Tc of the one or more polyolefins and to be devoid of a halogenated atom and/or an aromatic group;
   contacting the surface of the article with the one or more texturing solvents under texturing conditions;
   optionally rinsing the article;
   drying the article; and
   recovering an article with a textured surface;
   and in that in the step of providing an article with a surface, the article has an initial water contact angle following ISO 19403-6:2017 and in the step of recovering an article with a textured surface the article has a textured surface with water contact angle following ISO 19403-6:2017 that is increased by comparison to the initial water contact angle.

2. The process according to claim 1, is characterized in that the one or more terpenes are selected from α-bisabolol, α-cedrene, α-phellandrene, α-pinene, α-terpineol, β-pinene, β-caryophyllene, borneol, cadinene, camphene, camphor, citral, citronellol, 3-carene, D-limonene, L-limonene, dipentene, eucalyptol, farnesene, fenchol, γ-terpinene, geraniol, geranyl acetate, humulene, linalool, menthol, menthone, myrcene, nerol, nopol, ocimene, orange terpenes, phytol, terpinolene, valencene and any combination thereof.

3. The process according to claim 1, is characterized in that the one or more alkanes are selected from $C_9$-$C_{20}$ alkanes and any combination thereof.

4. The process according to claim 1, is characterized in that the one or more vegetable oils are selected from olive oil, peanut oil, coconut oil, canola oil, palm oil, sunflower oil and any combination thereof.

5. The process according to claim 1, is characterized in that the one or more texturing solvents have a boiling point of at least 120° C. and/or in that the drying step comprises drying the article at a drying temperature ranging from 20 to 80° C. through a drying time ranging from 6 to 24 hours.

6. The process according to claim 1, is characterized in that the one or more texturing solvents are selected to have a boiling point of at most Tm+75° C., with Tm being the melting temperature of the one or more polyolefins as determined according to ISO 11357-3:2018; and/or in that the one or more polyolefins are or comprise polypropylene and the one or more texturing solvents are selected to have a boiling point of at most 200° C.

7. The process according to claim 1, is characterized in that the one or more texturing solvents are selected to have a boiling point above Tm+75° C., with Tm being the melting temperature of the one or more polyolefins as determined according to ISO 11357-3:2018 and in that the step of rinsing the article is performed.

8. The process according to claim 1, is characterized in that the step of rinsing the article is performed with one or more rinsing solvents selected to have a boiling point of at most Tm−10° C. with Tm being the melting temperature of the one or more polyolefins as determined according to ISO 11357-3:2018; and/or in that the step of rinsing the article is performed with one or more rinsing solvents selected from acid acetic, acetone, butanol, butanone, t-butyl alcohol, cyclohexane, methylcyclohexane, diethyl ether, 1,2-dimethoxy-ethane, 1,4-dioxane, ethanol, ethyl acetate, heptane, hexane, methanol, methyl t-butyl ether, pentane, propanol, tetrahydrofuran, water and any mixture thereof.

9. The process according to claim 1, is characterized in that the step of contacting the surface of the article with the one or more texturing solvents is performed by immersion of the article in one or more baths of the one or more texturing solvents under texturing conditions.

10. The process according to claim 9, is characterized in that the immersion of the article in a bath of the one or more texturing solvents is a single immersion or in that the immersion of the article in a bath of the one or more texturing solvents comprises at least two successive immersions in two baths.

11. The process according to claim 1, is characterized in that the one or more polyolefins are selected from polyethylene, polypropylene or any mixture thereof; and/or in that the drying step comprises a sub-step of evacuating.

12. The process according to claim 1, is characterized in that the texturing conditions comprise the one or more texturing solvents being at a temperature ranging from 80° C. to 140° C.

13. The process according to claim 1, is characterized in that the article is selected from a film, a molded article, an injected article and a blow-molded article.

14. The process according to claim 1, is characterized in that in the textured surface has a water contact angle following ISO 19403-6:2017 of at least 130°.

15. The process according to claim 1, is characterized in that in the texturing conditions comprise a contact time for a period ranging from 0.1 second to 5 minutes.

* * * * *